(12) United States Patent
Iraudo et al.

(10) Patent No.: US 9,189,963 B2
(45) Date of Patent: Nov. 17, 2015

(54) PROCEDURE FOR FACILITATING THE APPROACH TO A PLATFORM

(71) Applicant: AIRBUS HELICOPTERS, Marignane, Cedex (FR)

(72) Inventors: Lionel Iraudo, Saint Cannat (FR); Nicolas Canale, Marseille (FR)

(73) Assignee: Airbus Helicopters, Marignane Cedex (FR)

( * ) Notice: Subject to any disclaimer, the term of this patent is extended or adjusted under 35 U.S.C. 154(b) by 190 days.

(21) Appl. No.: 14/189,242

(22) Filed: Feb. 25, 2014

(65) Prior Publication Data

US 2014/0244079 A1    Aug. 28, 2014

(30) Foreign Application Priority Data

Feb. 25, 2013  (FR) .................................... 13 00428

(51) Int. Cl.
*G06F 19/00* (2011.01)
*G08G 5/02* (2006.01)
*G05D 1/06* (2006.01)

(52) U.S. Cl.
CPC ................ *G08G 5/02* (2013.01); *G05D 1/0676* (2013.01)

(58) Field of Classification Search
CPC ..... G06G 5/025; G06G 5/065; G06G 5/0013; G06G 5/0021; G06G 5/0086; G06G 5/0008; G06G 5/0078; G06G 5/045; G06G 5/0039; G05D 1/0676; G05D 1/0607; G05D 1/0816; G05D 1/0833; G05D 1/0638
USPC .............. 701/3, 4, 5, 6, 7, 8, 9, 10, 11, 14–16
See application file for complete search history.

(56) References Cited

U.S. PATENT DOCUMENTS

| | | | |
|---|---|---|---|
| 6,720,891 B2 * | 4/2004 | Chen .................... | G01C 23/005 340/969 |
| 8,140,199 B2 * | 3/2012 | Barry .................... | G01C 23/005 340/945 |
| 2008/0119970 A1 | 5/2008 | Campbell et al. | |
| 2010/0168939 A1 * | 7/2010 | Doeppner .............. | G08G 5/025 701/16 |

OTHER PUBLICATIONS

French Search Report for FR 1300428, Completed by the French Patent Office on Jan. 23, 2014, 8 pages.
Valner., Giant: GNSS Introduction in the Aviation Sector Jan. 24, 2008, XP 003032932, 8 pages, "EGNOS Offshore Helicopter Approach Procedure."

(Continued)

*Primary Examiner* — Muhammad Shafi
(74) *Attorney, Agent, or Firm* — Brooks Kushman P.C.

(57) ABSTRACT

A procedure for facilitating the approach to a platform [PF] with an aircraft [1] including a construction stage [STP1] for a database [5] that includes, for each stored platform [PF], attributes that include at least one platform identifier, the coordinates of the platform, a landing height [HDECK] of a landing zone of the platform, and the radius (OR) of a circle within which the platform is inscribed. During a parameterization stage [STP2], the target platform to be reached is determined, along with a course (CRS) to be followed and a height parameter relative to a minimum decision altitude (MDA). During a construction stage [STP3], the position of an initial approach fix (IAF) is determined, along with the position of a final approach fix (FAF), an offset point (OIP), and a decision point (MAP), in response to the information and in response to the attributes.

20 Claims, 2 Drawing Sheets

(56) References Cited

OTHER PUBLICATIONS

U.S. Department of Transportation Federal Aviation Administration, Advisory Circular No. 90-80B, Apr. 12, 1999, XP055097872, 58 pages, "Approval of Offshore Standard Approach Procedures, Airborne Radar Approaches, and Helicopter En Route Descent Areas."

Safety Regulation Group, Civil Aviation Authority, CAA Paper No. Jan. 2010, Published May 2010, 96 pages, "The SBAS Offshore Approach Procedure (SOAP)."

Official Journal of the European Union Oct. 25, 2012, Commission Regulation (EU) No. 965/2012 of Oct. 5, 2012, 148 pages, "Laying down technical requirements and administrative procedures related to air operations pursuant to Regulation (EC) No. 216/2008 of the European Parliament and of Council."

Esterline CMC Electronics Operational Program, CMA-9000, Operational Program S/W 169-614876-022, Aug. 21, 2008, 1246 Pages, "Operator's Manual Flight Management System."

McFarlane., Second GIANT User Forum, Brussels, Oct. 9, 2008, 9 Pages, "A New Procedure for North Sea Helicopter Operations."

Dodson et al. Paper presented at the 23rd European Rotocraft Forum, Dresden, Germany, Sep. 1997, p. 61.1-61.14, "A North Sea Trial to Investigate the use of Differential GPS for Instrument Approaches to Offshore Platforms."

JAR OPS 3, Joint Aviation Authorities Amendment 3, Dated Apr. 1, 2004, Amendment 2 Published Jan. 1, 2002, 356 Pages, "Joint Aviation Requirements: Commercial Air Transportation (Helicopters)."

\* cited by examiner

PROCEDURE FOR FACILITATING THE APPROACH TO A PLATFORM

CROSS REFERENCE TO RELATED APPLICATION

This application claims priority to French patent application No. FR 13 00428 filed on Feb. 25, 2013, the disclosure of which is incorporated in its entirety by reference herein.

BACKGROUND OF THE INVENTION (1) Field of the Invention

The present invention relates to a procedure for facilitating the approach to a platform from an aircraft, and particularly from a short-landing aircraft such as an aircraft equipped, for example, with a rotary wing.

(2) Description of Related Art

Thus, the invention lies within the technical field of systems that provide assistance for the piloting of an aircraft, including, in particular, automated systems that aid the platform approach for rotary-wing aircraft.

In point of fact, a rotary-wing aircraft should be able to locate mobile platforms or vessels and to approach them safely, regardless of weather and visibility conditions, while avoiding any obstacles that may be present in the approach zone.

The approach is conducted by taking into consideration the direction and speed of the wind in the area; the type of platform to be approached (fixed platforms, mobile platforms, ships, or barges); any surrounding obstacles (cranes, barges, boats employed in the positioning of the platform, container vessels or supertankers navigating around the approach zone, or other surrounding platforms); and the comfort of the passengers.

Platform approaches typically consist of successive flight segments.

Accordingly, the approach includes an arrival segment that links the last flight point in the current flight phase and an initial approach point identified in English by the acronym "IAF" (Initial Approach Fix). This arrival segment is usually located at an altitude of 1,500 feet. It should be noted that the symbol "ft." refers to the unit of length known in English as "feet," each of which is equivalent to 30.48 centimeters.

An initial approach segment may link the initial approach fix (IAF) to an intermediate point identified in English by the acronym "IF" (Intermediate Fix). The purpose of this initial approach segment is to allow the aircraft to decelerate and to align itself along the trajectory to be followed.

An intermediate approach segment may link the intermediate fix (IF) to a final approach point identified in English by the acronym "FAF" (Final Approach Fix) in order to descend to an altitude that may be as low as 1,000 feet. The purpose of this segment is to align the aircraft, to decelerate, and to prepare for the final approach segment.

A final approach segment links the final approach fix (FAF) and a decision point identified in English by the acronym "MAP" (Missed Approach Point).

If the pilot establishes visual contact with the platform at the decision point, the pilot may land his aircraft on that platform.

Conversely, a segment known as a "go-around" must be performed if visual contact with the platform is not achieved at this stage in the approach. This go-around segment may also be performed at any time during the approach if the crew deems it appropriate. The purpose of this go-around segment is to return to a safe altitude.

The following documents contain known platform approaches:

The document designated as "AC90-80B" and entitled "Approval of Offshore Standard Approach Procedures, Airborne Radar Approaches, and Helicopter En Route Descent Areas", published on Apr. 12, 1999;

JAR OPS 3, Section 2, Subpart E, IEM to Appendix 1 to JAR-OPS 3.430, sub-paragraph (d)" (Amendment 2, published on Jan. 1, 2002);

EU-OPS COMMISSION REGULATION (EU) No. 965/2012, of Oct. 5, 2012 (AMC1 CAT.OP.MPA.120 and GM1 CAT.OP.MPA.120); and CAA paper No. 2010/01, entitled "The SBAS Offshore Approach Procedure (SOAP)".

When weather conditions are unfavorable, an instrument approach is advantageous in terms of the stress imposed on the crew, who must manually pilot the aircraft in order to guide it to an area from which the platform can be acquired visually.

During the transition between the instrument-flight phase and the visual-flight phase, the crew must switch continuously between what is shown on the flight displays on the instrument panel and what can be observed through the windows in order to detect any indications and/or visual signs (such as lights or relief features) that allow the position of the platform to be confirmed. Therefore, this type of approach to platform is not the most practical one, and may sometimes give rise to errors of interpretation, for example, in the case of fog that causes a temporary loss of the visual acquisition of the landing target.

Up until now, the instrument approaches to a mobile platform or vessels have been conducted without the use of the navigation computer, identified in English by the acronym "FMS" (Flight Management System), and without a link to the autopilot of the aircraft on an approach trajectory predefined by the FMS.

Today, certain platforms are equipped with a device, identified in English by the acronym "NDB" (Non-Directional Beacon), which is used by the crew through the navigation computer as an aid to navigation and for the correlation of the position of the aircraft with relative precision. However, this resource does not allow for the construction of an approach flight plan.

A navigation computer is known that is used to provide horizontal guidance during the enroute phase. For the approach phase, the crew determines, as an aid to navigation, an off-route target point that corresponds to the coordinates of the platform to be reached. However, the navigation computer does not segment the various phases of the approach to the platform in order to slave the autopilot to these guidance data (e.g., the horizontal and vertical deviation, and the speed indication).

Therefore, the approach is conducted manually or semi-automatically, with the aid of certain higher autopilot modes, using the approach charts published by the operators and approved by the local authorities.

The aircraft's weather radar may also be used as a means for identifying the platform and for detecting and avoiding any temporary or stationary obstacles during the approach and the final descent.

Document US 2010/0168939 proposes a module and an automated procedure for an approach to a platform along an approach trajectory constructed from approach points.

According to this document US 2010/0168939, a pilot enters into a module on board the aircraft:

the coordinates of the target platform to be reached;
a final approach course toward the platform;

an offset distance that laterally separates the trajectory to be followed from a trajectory aimed at the platform according to this approach course; and a descent height.

Then, in response to the entered data, the module on board the aircraft determines, in particular, the position of the initial approach fix (IAF) and of the final approach fix (FAF). The aircraft is then guided toward the initial approach fix.

Thus, the constructed approach trajectory includes a horizontal segment that links an initial approach fix (IAF) and a final approach fix (FAF).

The trajectory then includes a descent segment followed by a level segment in order to link the final approach fix (FAF) to a decision point (MAP).

The initial approach fix (IAF), the final approach fix (FAF), and the decision point (MAP) are contained in a vertical plane that is parallel to the selected approach course. It should be understood that the term "vertical plane" refers to a plane that is oriented by weight, such that points on this vertical plane may be located at different altitudes.

This vertical plane is offset in relation to the platform by a distance equal to the offset distance that is entered.

This approach may entail the disadvantage of not being compatible with certain current procedures. In particular, it is not compatible with the ARA EU OPS approaches currently used in the North Sea.

Furthermore, this document does not take into consideration the specific characteristics of the platforms. In point of fact, the platforms have different shapes. Therefore, the specific location of a landing zone on a platform may not match the platform coordinates that were entered.

Document US 2008/0119970 relates to a precision approach guidance system that includes an inertial system, a terrain database, and an image sensor (or telemetry means).

The known technological background also includes the following documents:

Esterline CMC electronics, CMA-9000 Flight Management System Operator's Manual, Operational Program S/VV 169-614876-022, publication No. 9000-GEN-0105, Item No. 930-6000088-00 (Aug. 21, 2008);

N. McFarlane, A New Procedure for North Sea Helicopter Operations, Second GIANT User Forum (Brussels, Belgium; Oct. 9, 2008);

K. M. Dodson and J. R. A. Stevens, A North Sea Trial to Investigate the Use of Differential GPS for Instrument Approaches to Offshore Platforms (paper presented at the 23rd European Rotorcraft Forum (Dresden, Germany; September 1997);

U.S. Pat. No. 6,720,891; and

XP003032932, "EGNOS Offshore Helicopter Approach Procedure" (GIANT GNSS INTRODUCTION IN THE AVIATION SECTOR; Jan. 24, 2008).

Thus, the purpose of the present invention is to propose an approach procedure intended to assist a crew in landing on a platform with an aircraft.

BRIEF SUMMARY OF THE INVENTION

According to the invention, a procedure for facilitating the approach to a platform with an aircraft includes:

a construction stage for constructing a database of platforms, which database includes, for each stored platform, attributes that include at least one platform identifier, the coordinates of the platform, a height of a landing zone on the platform, known as the "landing height", and the radius of a circle within which the platform is inscribed;

a parameterization stage on board the aircraft in a parameterization module for determining the following information:

the target platform to be reached from among the platforms stored in the said database;

a course to be followed in order to reach the said target platform; and a height parameter relative to a minimum decision altitude for a descent in a final approach toward the said target platform;

a construction stage for constructing an approach trajectory implemented by a navigation module in order to determine the position of an initial approach fix (IAF), a final approach fix (FAF), an offset point (OIP), and a decision point (MAP) in response to the said parameterized information and the said attributes of the target platform, with the initial approach fix (IAF), the final approach fix (FAF), the offset point (OIP), and the location of the coordinates of the target platform being present in a single vertical plane oriented toward the said course, and with the decision point (MAP) being offset in relation to this vertical plane.

It should be recalled that a "height" represents the vertical distance between a body and a piece of ground, while an "altitude" represents the vertical distance between a body and sea level. The height of an aircraft is customarily measured by a radio beacon using [radio] waves, with the altitude being measured by an altimeter using a pressure measurement.

Consequently, the height and the altitude of an aircraft or of a landing zone of a platform above the sea refer to equivalent distances if the altimeter is calculated with the pressure set to the atmospheric pressure at sea level (QNH).

Consequently, this procedure does not employ an offset distance according to document US 2010/0168939. On the contrary, the initial approach fix (IAF), the final approach fix (FAF), and the offset point (OIP) are located in a vertical plane that contains the coordinates of the target platform to be reached. The approach trajectory deviates from the vertical plane only starting at the offset point (OIP), solely to meet the decision point.

Consequently, this procedure proposes the automatic development of an innovative approach trajectory that, in particular, is compatible with the ARA EU OPS approaches that are currently used in the North Sea.

This procedure also introduces an innovative parameter for developing the approach trajectory. This innovative parameter is the radius, known in English as the "obstacle radius", of the circle within which the target platform is inscribed.

Thus, unlike the trajectories based solely on the accordance of a platform, the approach trajectory takes into consideration the specific geometric features of the target platform.

Accordingly, the procedure makes it possible to facilitate the work of a crew by developing the trajectory to be followed easily. The parameterization stage may also be semi-automatic, offering default choices to the crew, so that the crew can simply validate the proposed choices or else modify them.

The procedure may also include one or more of the additional characteristics described below.

Thus, this procedure may include a guidance stage for the calculated initial approach fix (IAF). A guidance unit then guides the aircraft to this initial approach fix.

The guidance unit may include a horizontal and/or vertical guidance module that communicates with an autopilot system to guide the aircraft along the approach trajectory developed by the navigation module.

For example, the parameterization module, the navigation module, a horizontal guidance module, and a vertical guidance module are implemented in a navigation computer. This navigation computer may then provide guidance data to an autopilot system in order to guide the aircraft along the developed trajectory.

As an option, information may also be displayed on flight instruments, so that the pilot can manually guide the aircraft along the developed trajectory. For example, an optimal course to be followed or a descent speed may be displayed in order to assist the pilot in following this trajectory. For example, this course may be selected in order to head the aircraft into the wind.

Furthermore, during the parameterization stage, a type of approach may be selected from a list of predetermined types of approaches. Such a list may include, for example, an ARA-type approach or a DELTA30-type approach.

Thus, the various calculated points of the approach trajectory may reflect specific regulatory aspects of the standards that define these two types of approaches.

According to a first variant, the height parameter includes a choice of the manual determination of a minimum decision altitude (MDA) that is manually parameterized by a pilot and at which the said offset point (OIP) and the said decision point (MAP) are positioned.

During the parameterization stage, the crew selects manual parameterization and determines the minimum decision altitude (MDA). For this purpose, the crew may enter this minimum decision altitude (MDA), or, for example, may validate a default altitude.

According to a second variant, the height parameter is a choice that is determined automatically by the navigation module for a minimum decision altitude (MDA) at which the said offset point (OIP) and the said decision point (MAP) are positioned.

The navigation unit then determines the appropriate minimum decision altitude (MDA), based on relationships that are stored and established by the constructor.

For example, the minimum decision altitude (MDA) is the maximum value between a threshold altitude, on the one hand, and the sum of the said landing height [HDECK] and a minimum decision constant predetermined by the constructor, on the other hand.

The navigation module may also determine the time of arrival at the platform and consequently pre-determine the minimum decision altitude (MDA), which will vary depending on the arrival time.

In particular, one threshold altitude (for example, 200 ft.) can be specified during a daylight flight, and a different threshold altitude (for example, 300 ft.) can be specified during a night flight.

For this purpose, it should be understood that in order to estimate the arrival time, the navigation module relies on predetermined and stored forward speeds between the various calculated waypoints.

The first variant and the second variant are compatible with each other. Accordingly, during the parameterization stage, a crew may select either one of these variants.

Furthermore, the decision point (MAP) may be positioned by determining a longitudinal distance [D1] separating a point, known as the calculation point, from the platform, and by determining an orthogonal distance [D2] separating the calculation point from the decision point (MAP), in order to offset the decision point from the vertical plane according to the following relationships:

$$D1 = a * \cos\left[-\alpha + \arcsin\left(\frac{c}{a} * \sin\alpha\right)\right]$$

$$D2 = a * \sin\left[-\alpha + \arcsin\left(\frac{c}{a} * \sin\alpha\right)\right]$$

with "a"=OR+MDR and "c"=CTEOIP+OR where "*" represents the multiplication sign; "OR" represents the said radius of a circle within which the target platform is inscribed; "MDR" and "CTEOIP" represent two constants set by the constructor; and "α" represents an offset angle set by the constructor.

The offset angle and the constant [MDR] may vary depending on the type of approach.

Thus, this decision point is positioned as a function of a radius of the platform, which radius is stored in a database, and of two constants set by the constructor.

Furthermore, during the parameterization stage, a choice is made regarding the side for the offset of the decision point in relation to the vertical plane.

The crew may choose to position the decision point to the left or to the right of the vertical plane, with "left" and "right" being understood in terms of the direction of travel of the aircraft toward the platform.

As a variant or as a supplement, the procedure may impose an offset side. For example, the database may specify an offset side, in order, for example, to avoid an identified obstacle.

Furthermore, the offset point (OIP) is positioned at an offset distance [DOIP] from the target platform that is equal to the sum of a constant [CTEOIP] set by the constructor and from the said radius of a circle within which the target platform is inscribed.

Moreover, the final approach fix (FAF) is positioned at a minimum safe altitude (MSA), which minimum safe altitude (MSA) is equal to the maximum value between a threshold minimum safe altitude, on the one hand, and the sum of the said landing height and a minimum safety constant predetermined by the constructor, on the other hand.

The threshold minimum safe altitude and the minimum safety constant may vary depending on the type of approach.

The final approach fix (FAF) is then positioned at a final approach distance [DFAF] from the target platform that is equal to:

$$DFAF = OR + k1 + k2 + \frac{MIN - k4}{\tan\beta} + \frac{MSA - MIN}{\tan\beta}$$

where "DFAF" represents the final approach distance; "OR" represents the said radius of a circle within which the target platform is inscribed; "K1" represents an approach constant set by the constructor; "K2" represents a variable frozen by the constructor; "MSA" represents a minimum safe altitude at which the final approach fix is positioned; "MIN" represents a minimum altitude set by the constructor; and "β" represents the angle of a descending flight segment connecting the final approach fix to a horizontal plane containing the said offset point (OIP) and the said decision point (MAP).

The angle "β" may vary depending on the type of approach selected.

Furthermore, the said initial approach fix (IAF) is positioned at an altitude known as the "minimum enroute altitude" (MEA), which minimum enroute altitude (MEA) may optionally be equal to the maximum value between a threshold minimum enroute altitude, on the one hand, and the sum of the said landing height and a minimum enroute constant predetermined by the constructor, on the other hand.

The minimum enroute altitude (MEA) does not vary depending on the type of approach.

Thus, the initial approach fix (IAF) is positioned at an initial approach distance [DIAF] from the target platform that is equal to:

$$DIAF = OR + k1 + k2 + \frac{\text{MIN} - k4}{\tan\beta} + \frac{\text{MSA} - \text{MIN}}{\tan\beta} + \frac{\text{MEA} - \text{MSA}}{\tan\gamma} + k3$$

where "DFAF" represents the final approach distance; "OR" represents the said radius of a circle within which the target platform is inscribed; "K1" represents an approach constant set by the constructor; "K2" represents a variable frozen by the constructor; "MSA" represents a minimum safe altitude at which the final approach fix is positioned; "MIN" represents a minimum altitude set by the constructor; "MEA" represents a minimum enroute altitude at which the initial approach fix is positioned; "β" represents the angle of a descending flight segment connecting the final approach fix to a horizontal plane containing the said offset point (OIP) and the said decision point (MAP); "γ" represents the angle of a descending flight segment connecting the initial approach fix to a horizontal plane containing the said final approach fix; and "K3" represents a variable frozen by the constructor.

The angles "β" and "γ" may vary depending on the type of approach.

Moreover, the approach trajectory may include an intermediate approach fix [IF] interposed between the initial approach fix (IAF) as well as the final approach fix (FAF), with the intermediate approach fix being positioned at the same minimum enroute altitude as the initial approach fix (IAF), and at an intermediate approach distance [DIF] from the target platform that is equal to $$DIF = OR + k1 + k2 + \frac{\text{MIN} - k4}{\tan\beta} + \frac{\text{MSA} - \text{MIN}}{\tan\beta} + \frac{\text{MEA} - \text{MSA}}{\tan\gamma}$$

where "DIF" represents the intermediate approach distance; "OR" represents the said radius of a circle within which the target platform is inscribed; "K1" represents an approach constant set by the constructor; "K2" represents a variable frozen by the constructor; "MSA" represents a minimum safe altitude at which the final approach fix is positioned; "MIN" represents a minimum altitude set by the constructor; "MEA" represents a minimum enroute altitude at which the initial approach fix is positioned; "β" represents the angle of a descending flight segment connecting the final approach fix to a horizontal plane containing the said offset point (OIP) and the said decision point (MAP); and "γ" represents the angle of a descending flight segment connecting the initial approach fix to a horizontal plane containing the said final approach fix.

Moreover, the approach trajectory may include a level point [LPO] interposed between the final approach fix (FAF) and the offset point (OIP), with the level point being positioned at the same minimum decision altitude (MDA) as the offset point (OIP) and at a level distance [DLPO] from the target platform that is equal to:

$$DLPO = OR + k1 + k2 + \frac{\text{MIN} - k4}{\tan\beta}$$

where "DLPO" represents the plateau distance; "OR" represents the said radius of a circle within which the target platform is inscribed; "K1" represents an approach constant set by the constructor; "K2" represents a variable frozen by the constructor; "MIN" represents a minimum altitude set by the constructor; "β" represents the angle of a descending flight segment connecting the final approach fix to a horizontal plane containing the said offset point (OIP) and the said decision point (MAP); and "k4" represents a predetermined constant.

If the final approach fix is located at less than a minimum distance from the platform, the navigation module moves the calculated level point [LPO] and the calculated final approach fix away from the platform by a given distance, so that the final approach fix is located at least at this minimum distance from the platform, with this minimal distance depending on the type of approach.

This characteristic makes it possible to comply with certain regulations.

For example, the minimum distance is 4 nm. If the final approach fix is at least 3.8 nm from the platform, the navigation module shifts the calculated level point and the calculated final approach fix by 0.2 nm from the platform, so that the final approach fix is located 4 nm from the platform.

It will be recalled that the unit "nm" refers to one nautical mile, which is equivalent to 1,852 meters.

BRIEF DESCRIPTION OF THE SEVERAL VIEWS OF THE DRAWINGS

The invention and its advantages will become clear in greater detail within the scope of the following description, which includes examples of embodiments provided for illustrative purposes, with reference to the attached figures, among which.

Elements that appear in two or more different figures are indicated by the same reference number.

DETAILED DESCRIPTION OF THE INVENTION

Figure 1:
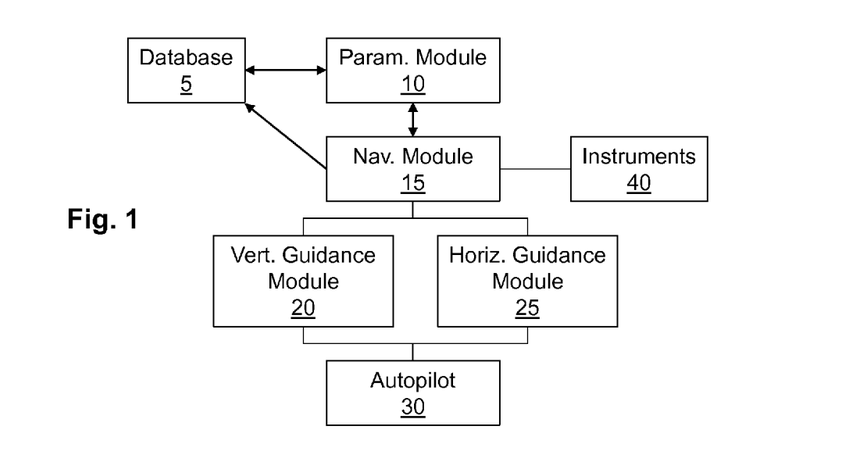
FIG. 1 is a diagram illustrating an aircraft implementing the procedure according to the invention.

FIG. 1 illustrates an aircraft [1] and, in particular, a rotary-wing aircraft that can land on an offshore platform.

This aircraft [1] is equipped with a navigation-aid system that includes an onboard database [5] that communicates with a parameterization module.

The parameterization module may be one module of a navigation computer, such as a computer identified by the acronym "FMS". The database [5] may be connected to such a computer, or, for example, may represent a constituent element of that computer.

It will be understood that the database includes non-volatile memory that contains data stored by the constructor.

The parameterization module includes, for example, a display screen; input means that can be operated by a crew;

memory; and a computing unit (for example, of the processor type) that executes stored instructions.

The navigation-aid system also includes a navigation module [15] that may be connected simultaneously to the database [5] and to the parameterization module [10]. Depending on elements transmitted by the database [5] as well as by the parameterization module [10], and, if applicable, also depending on the stored elements, the navigation module [15] automatically develops an approach trajectory.

The navigation module may be incorporated into a navigation computer.

The navigation module may then communicate with a vertical guidance module [20] and/or with a horizontal guidance module [25], generating instructions that are transmitted to an autopilot system [30]. The autopilot system then automatically acts on control means in order to guide the aircraft. The literature may be consulted for information about such an autopilot system or about guidance modules.

The navigation module may also communicate with onboard instruments [40], optionally via the guidance modules. Information about the actions to be performed in order to follow the developed trajectory may also be displayed on flight instruments on board the aircraft.

Figure 2:
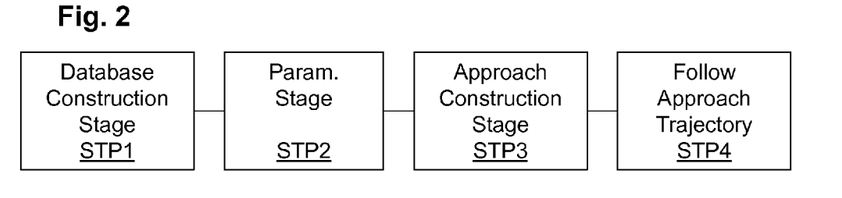
FIG. 2 is a diagram illustrating the procedure according to the invention.

FIG. 2 illustrates various stages in a procedure according to the invention, which procedure is implemented by a navigation-aid system.

During a construction stage [STP1], a user develops the database [5]. This user prepares a list of platforms that might constitute a destination for its aircraft.

The user then stores in the database [5] a plurality of attributes for each selected platform. These attributes include a platform identifier (ID); WPT coordinates for the platform; a landing height [HDECK] at which a landing zone is present on the platform; and the radius (OR) of a circle within which the platform is inscribed.

On board the aircraft, the crew may implement a parameterization stage [STP2] in order to parameterize the approach to a platform.

For this purpose, the crew may choose the target platform on which the aircraft is intended to land.

Figure 3:
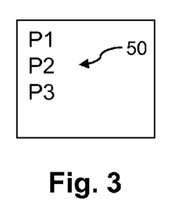
FIGS. 3 through 5 are diagrams illustrating a parameterization module.

With reference to FIG. 3, the parameterization module may display the list [50] of platforms [P1], [P2], [P3] stored in the database [5]. The crew may, for example, select platform [P1].

Figure 4:
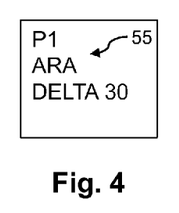

With reference to FIG. 4, and on an optional basis, the parameterization module [10] may, for example, display different types of available approaches [55]. It should be noted that the database may optionally include an attribute for the stored platforms that refers to these types of approaches.

This list of approaches may include, in particular, an ARA-type approach or a DELTA30-type approach.

Figure 5:
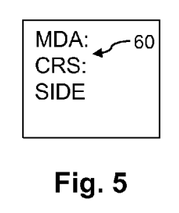

With reference to FIG. 5, the parameterization module allows the crew of the aircraft to parameterize other information. The parameterization module may display default values [60] for the information to be parameterized.

In particular, the parameterization module makes it possible to parameterize, during the parameterization stage [STP2], a course (CRS) to be followed in order to reach the target platform.

Furthermore, during this parameterization stage, the crew can process a height parameter relative to a minimum decision altitude (MDA) for a descent in a final approach toward the said target platform.

According to a first variant, the crew specifies that the minimum decision altitude (MDA) should be parameterized manually, and performs the said parameterization. The constructor may impose a minimum altitude to be observed for safety purposes. For example, the constructor may decide that the minimum decision altitude (MDA) should not be less than 300 ft., or even the sum of the landing height [HDECK] and a safety margin. This margin may be on the order of 50 ft.

According to a second variant, the crew specifies that the minimum decision altitude (MDA) should be parameterized automatically.

In this case, the minimum decision altitude (MDA) is either a threshold altitude or the sum of the landing height [HDECK] of the target platform and a minimum decision constant predetermined by the constructor. The higher value is then used.

The threshold altitude depends on visibility conditions, and particularly on whether the landing will take place during the day or at night. Accordingly, the threshold altitude may be 200 ft. for a daylight landing and 300 ft. for a night landing.

Consequently, the navigation module [15] may, if necessary, perform a pre-processing step in order to estimate the time of arrival at the target platform, in order to determine whether the landing will take place during the day or at night.

In the example described here, the crew may, if necessary, select an offset side [SIDE] in order to determine where the platform should be in relation to the aircraft at a decision point (MAP).

This decision point corresponds to a point at which the crew must decide whether to approach the platform in order to proceed with the landing, or—if it is determined that the landing cannot be made—to implement an alternative procedure.

With reference to FIG. 2, during a construction stage [STP3], the navigation module develops an approach trajectory to be followed in order to reach the target platform, based on the attributes of the platform that are present in the database [5], and also based on the information that was parameterized during the parameterization stage [STP2].

Figure 6:
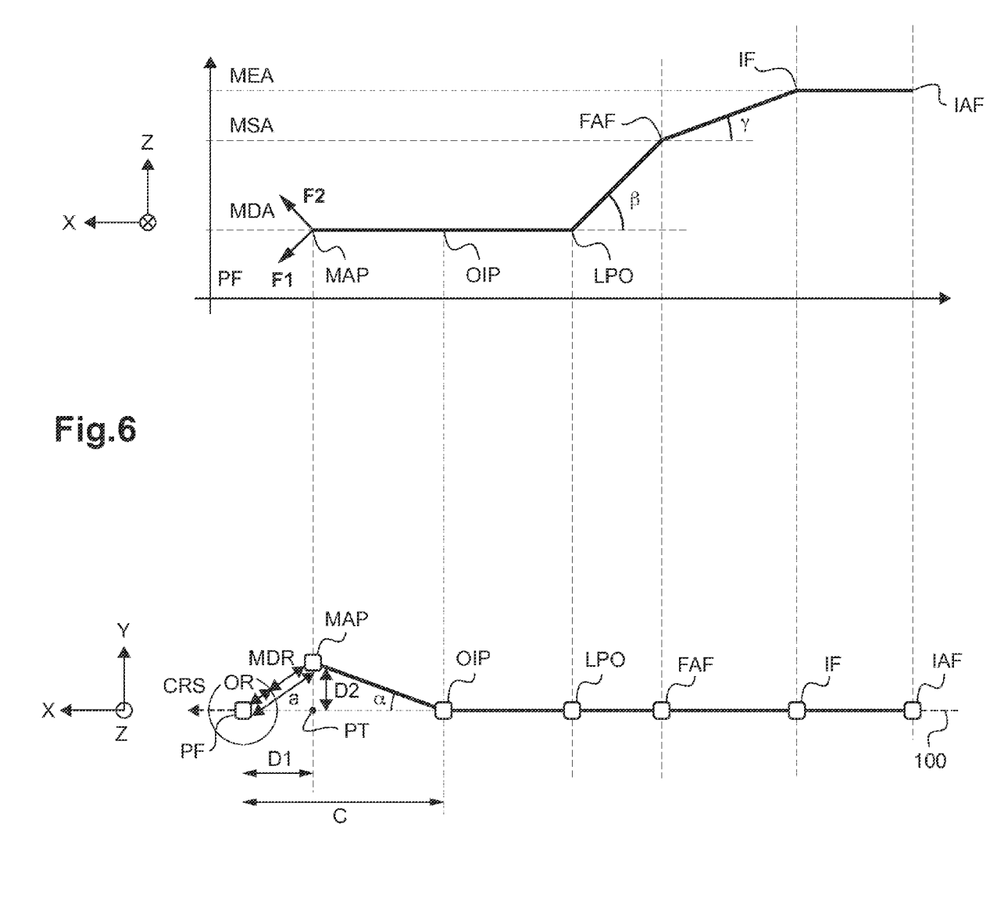
FIG. 6 is a diagram illustrating the constructive approach trajectory.

FIG. 6 illustrates the trajectory developed by the navigation module. More specifically, the upper part of FIG. 6 shows a side view, and thus an elevation view, of the trajectory developed in order to reach a platform [PF]. The lower part of FIG. 6 shows a top view of the developed trajectory.

In particular, the navigation module determines the position of an initial approach fix (IAF), a final approach fix (FAF), an offset point (OIP), and a decision point (MAP), based on the said information and the said attributes.

Optionally, an intermediate approach fix [IF] and a level point [LPO] are also determined.

The initial approach fix (IAF), the final approach fix (FAF), the offset point (OIP), the coordinates of the target platform, and, if applicable, the intermediate approach fix [IF] and the level point [LPO] are located in the same vertical plane [100]. This vertical plane is oriented toward the parameterized course (CRS).

Conversely, the decision point (MAP) is offset in relation to this vertical plane [100]. An offset to the left or to the right of the decision point in relation to the vertical plane may optionally be parameterizable during the parameterization stage.

The decision point, the offset point (OIP), and, if applicable, the level point [LPO] are located at a height equal to the minimum decision altitude (MDA).

The navigation module also determines the position of the decision point (MAP) in relation to the platform, doing so by estimating a longitudinal distance [D1] separating a calculation point [PT] from the platform along the said course (CRS), and by determining an orthogonal distance [D2] orthogonally separating the decision point (MAP) from the calculation point [PT]. Accordingly:

$$D1 = a*\cos\left[-\alpha + \arcsin\left(\frac{c}{a}*\sin\alpha\right)\right]$$

$$D2 = a*\sin\left[-\alpha + \arcsin\left(\frac{c}{a}*\sin\alpha\right)\right]$$

with "a"=OR+MDR and "c"=CTEOIP+OR
where "*" represents the multiplication sign; "OR" represents the radius of a circle within which the target platform is inscribed; "MDR" and "CTEOIP" represent two constants set by the constructor; and "α" represents an offset angle set by the constructor.

The constant [MDR], which is known as the "final offset constant", may have a value of 0.75 nm for an ARA-type approach and a value of 0.6 nm for a DELTA30-type approach. Similarly, the offset angle "α" may have a value of 10 degrees for an ARA-type approach and a value of 30 degrees for a DELTA30-type approach.

The constant [CTEOIP], which is known as the "initial offset constant", may have a value of 1.5 nm for an ARA-type approach and a value of 1.1 nm for a DELTA30-type approach.

It should be noted that the offset point (OIP) is located at an offset distance [DOIP] that is equal to the sum of the said initial offset constant [CTEOIP] and the said radius (OR).

When the approach trajectory includes a level point [LPO], the level point is located at a level distance [DLPO] from the target platform that is equal to:

$$DLPO = OR + k1 + k2 + \frac{\text{MIN} - k4}{\tan\beta}$$

where "DLPO" represents the plateau distance; "OR" represents the said radius of a circle within which the target platform is inscribed; "K1" represents an approach constant set by the constructor (for example, at 2 nm); "K2" represents a variable frozen by the constructor; "MIN" represents a minimum altitude set by the constructor (for example, on the order of 300 ft.); "β" represents the angle of a descending flight segment connecting the final approach fix to a horizontal plane containing the said offset point (OIP) and the said decision point (MAP); and "k4" represents a predetermined constant (for example, on the order of 200 ft.).

It should be noted that the variable [K2] may be null in the context of a DELTA30-type approach.

Conversely, the angle "β" (referred to, for the sake of convenience, as the "first angle") may have a value of 3.75 degrees for an ARA-type approach and a value of 3 degrees for a DELTA30-type approach.

Moreover, the final approach fix (FAF) is set at a minimum safe altitude (MSA).

This minimum safe altitude (MSA) is equal to a threshold minimum safe altitude (HMSS), or else is equal to the sum of the said landing height [HDECK] and a minimum safety constant [CMIN] predetermined by the constructor. The higher of the two values thus obtained will then be used, namely: MSA=max (HMSS, CMIN+HDECK)

The threshold minimum safe altitude (HMSS) may have a value of 1,000 ft. for an ARA-type approach and a value of 900 ft. for a DELTA30-type approach. Similarly, the minimum safety constant (CMIN) may, for example, have a value of 500 ft. for an ARA-type approach and a value of 400 ft. for a DELTA30-type approach.

The final approach fix (FAF) is then positioned at a final approach distance [DFAF] from the target platform that is equal to:

$$DFAF = DLPO + \frac{\text{MSA} - \text{MIN}}{\tan\beta}$$

where "DFAF" represents the final approach distance; "DLPO" represents the level distance; "MSA" represents the minimum safe altitude; "MIN" represents the minimum altitude set by the constructor; and "β" represents the angle of a descending flight segment connecting the final approach fix to a horizontal plane containing the said offset point (OIP) and the said decision point (MAP).

The initial approach fix (IAF) and, if applicable, the intermediate approach fix are positioned at a minimum enroute altitude (MEA). This minimum enroute altitude (MEA) is equal to a threshold minimum enroute altitude (HMRS), or else is equal to the sum of the landing height [HDECK] and a minimum enroute constant [CROUTE] predetermined by the constructor. The higher of the two values thus obtained will then be used, namely: MEA=max (HMRS, CROUTE+HDECK)

The threshold minimum enroute altitude (HMRS) may have a value of 1,500 ft., regardless of the type of approach. Similarly, the minimum enroute constant (CROUTE) may have a value of 1,000 ft., regardless of the type of approach.

When the approach trajectory includes an intermediate approach fix [IF], this intermediate approach fix is positioned at an intermediate approach distance [DIF] from the target platform that is equal to:

$$DIF = DFAF + \frac{\text{MEA} - \text{MSA}}{\tan\gamma}$$

where "DIF" represents the intermediate approach distance; "DFAF" represents the final approach distance; "MSA" represents the minimum safe altitude; "MEA" represents the minimum enroute altitude at which the initial approach fix is positioned; and "γ" represents the angle of a descending flight segment connecting the initial approach fix to a horizontal plane containing the said final approach fix.

The angle "γ" (referred to, for the sake of convenience, as the "second angle") may have a value of 2.35 degrees for an ARA-type approach and a value of 3 degrees for a DELTA30-type approach.

Thus, the initial approach fix (IAF) is positioned at an initial approach distance [DIAF] from the target platform that is equal to:

DIAF=DIF+k3 where "DFAF" represents the final approach distance; "DIF" represents the intermediate approach distance; and "K3" represents a constant frozen by the constructor.

The navigation module may then require that the aircraft be steered toward the initial approach fix (IAF). The initial approach fix (IAF) may be reached, for example, by means of a turn that passes through a point known in English as the "turn point".

In such a case, the developed approach trajectory is followed [STP4]:
  either by means of manual control of the aircraft, operated
    entirely by the crew, optionally with the aid of pilot-assistance data displayed on at least one flight instrument;

by means of manual control of the aircraft operated by the crew and also by means of automatic control operated by the autopilot system; for example, with the crew managing the vertical piloting of the aircraft and the autopilot system managing the horizontal piloting of the aircraft; or by means of automatic control operated by the autopilot system.

The crew may then decide to stop following the approach trajectory, or, if necessary, may require a change in the approach trajectory.

If the platform is within sight and if no obstacles are present, the crew may proceed toward the platform in order to perform the landing, starting from the offset point (OIP).

Otherwise, the aircraft is piloted toward the decision point (MAP). When the decision point is reached, and if the crew has the platform in sight and if the landing can be made, the crew will proceed toward the platform in the direction indicated by the arrow [F1]. Otherwise, the crew will implement a standard procedure for placing the aircraft on a related trajectory, as indicated by the arrow [F2].

Naturally, the present invention is subject to numerous variants in terms of its implementation. Although several embodiments have been described, it will be readily understood that not all of the possible modes can be identified exhaustively. Any of the means described herein may of course be replaced by equivalent means without departing from the scope of the present invention.

What is claimed is:

1. A procedure for facilitating the approach to a platform with an aircraft, the procedure comprising:
   determining a target platform to be reached from among platforms stored in a database by a database constructor, the database including, for each stored platform, attributes that include at least one platform identifier, the coordinates of the platform, at least one height of a landing zone of the platform, and the radius of a circle within which the platform is inscribed;
   determining a course to be followed in order to reach the target platform;
   determining a height parameter relative to a minimum decision altitude for a descent in a final approach toward the target platform, wherein the determining a target platform, the determining a course to be followed, and the determining a height parameter are performed by a processor during a parameterization stage on board the aircraft in response to at least one input to a user interface of a parameterization module;
   constructing in a construction stage an approach trajectory implemented by a navigation module; and piloting the aircraft to the target platform in accordance with the approach trajectory;
   wherein
   during the construction stage, the position of an initial approach fix is determined, along with the position of a final approach fix, an offset point and a decision point, in response to the information and in response to the attributes of the target platform, the final approach fix and the offset point, with the location of the coordinates of the target platform being present in a single vertical plane oriented toward the course, and with the decision point being offset in relation to the vertical plane.

2. The procedure according to claim 1, wherein during the parameterization stage, a type of approach is selected from a list of predetermined types of approaches.

3. The procedure according to claim 1, wherein the height parameter includes a choice of the manual determination of a minimum decision altitude that is manually parameterized by a pilot and at which the offset point and the decision point are positioned.

4. The procedure according to claim 1, wherein the height parameter is a choice that is determined automatically by the navigation module for a minimum decision altitude at which the offset point and the decision point are positioned.

5. The procedure according to claim 4, wherein the minimum decision altitude is the maximum value between a threshold altitude, and the sum of the landing height and a minimum decision constant predetermined by the constructor.

6. The procedure according to claim 5, wherein the navigation module determines the time of arrival at the platform, with the altitude threshold varying depending on the arrival time.

7. The procedure according to claim 1, wherein the offset point is positioned at an offset distance from the target platform that is equal to the sum of a constant set by the constructor and from the radius of a circle within which the target platform is inscribed.

8. The procedure according to claim 1, wherein the final approach fix is positioned at a minimum safe altitude, which minimum safe altitude is equal to the maximum value between a threshold minimum safe altitude, and the sum of the landing height and a minimum safety constant predetermined by the constructor.

9. The procedure according to claim 1, wherein the final approach fix is positioned at a final approach distance from the target platform that is equal to:

$$DFAF = OR + k1 + k2 + \frac{MIN - k4}{\tan\beta} + \frac{MSA - MIN}{\tan\beta}$$

where "DFAF" represents the final approach distance; "OR" represents the radius of a circle within which the target platform is inscribed; "K1" represents an approach constant set by the constructor; "K2" represents a variable frozen by the constructor; "K4" represents a predetermined constant; "MSA" represents a minimum safe altitude at which the final approach fix is positioned; "MIN" represents a minimum altitude set by the constructor; and "β" represents the angle of a descending flight segment connecting the final approach fix to a horizontal plane containing the offset point and the decision point.

10. The procedure according to claim 1, wherein the initial approach fix is positioned at a minimum enroute altitude, which minimum enroute altitude is equal to the maximum value between a threshold minimum enroute altitude, and the sum of the landing height and a minimum enroute constant predetermined by the constructor.

11. The procedure according to claim 1, wherein the initial approach fix is positioned at an initial approach distance from the target platform that is equal to:

$$DIAF = OR + k1 + k2 + \frac{MIN - k4}{\tan\beta} + \frac{MSA - MIN}{\tan\beta} + \frac{MEA - MSA}{\tan\gamma} + k3$$

where "DFAF" represents the final approach distance; "OR" represents the radius of a circle within which the target platform is inscribed; "K1" represents an approach constant set by the constructor; "K2" represents a variable frozen by the constructor; "K4" represents a predetermined constant; "MSA" represents a minimum safe altitude at which the final approach fix is positioned; "MIN" represents a minimum altitude set by the constructor; "β" represents the angle of a descending flight segment connecting the final approach fix to a horizontal plane containing the offset point and the decision point; "γ" represents the angle of a descending flight segment connecting the initial approach fix to a horizontal plane containing the final approach fix; and "K3" represents a variable frozen by the constructor.

12. The procedure according to claim 1, wherein the approach trajectory includes an intermediate approach fix interposed between the initial approach fix and the final approach fix, with the intermediate approach fix being positioned at the same minimum enroute altitude as the initial approach fix, and at an intermediate approach distance from the target platform that is equal to:

$$DIF = OR + k1 + k2 + \frac{MIN - k4}{\tan\beta} + \frac{MSA - MIN}{\tan\beta} + \frac{MEA - MSA}{\tan\gamma}$$

where "DIF" represents the intermediate approach distance; "OR" represents the radius of a circle within which the target platform is inscribed; "K1" represents an approach constant set by the constructor; "K2" represents a variable frozen by the constructor; "K4" represents a predetermined constant; "MSA" represents a minimum safe altitude at which the final approach fix is positioned; "MIN" represents a minimum altitude set by the constructor; "MEA" represents a minimum enroute altitude at which the initial approach fix is positioned; "β" represents the angle of a descending flight segment connecting the final approach fix to a horizontal plane containing the offset point and the decision point; and "γ" represents the angle of a descending flight segment connecting the initial approach fix to a horizontal plane containing the final approach fix.

13. The procedure according to claim 1, wherein the approach trajectory includes a level point interposed between the final approach fix and the offset point, with the level point being positioned at the same minimum decision altitude as the offset point and at a level distance from the target platform that is equal to:

$$DLPO = OR + k1 + k2 + \frac{MIN - k4}{\tan\beta}$$

where "DLPO" represents the level distance; "OR" represents the radius of a circle within which the target platform is inscribed; "K1" represents an approach constant set by the constructor; "K2" represents a variable frozen by the constructor; "MIN" represents a minimum altitude set by the constructor; "β" represents the angle of a descending flight segment connecting the final approach fix to a horizontal plane containing the offset point and the decision point; and "K4" represents a predetermined constant.

14. The procedure according to claim 13, wherein the final approach fix is located at less than a minimum distance from the platform, the navigation module moves the calculated level point and the calculated final approach fix away from the platform by a given distance, so that the final approach fix is located at least at this minimum distance.

15. The procedure according to claim 1, wherein a vertical guidance module and a horizontal guidance module communicate with a piloting system to guide the aircraft along the approach trajectory developed by the navigation module.

16. The procedure according to claim 1, further comprising guiding the aircraft in a guidance stage to the calculated initial approach fix.

17. A procedure for facilitating the approach to a platform with an aircraft, said procedure comprises:
  determining a target platform to be reached from among platforms stored in a database by a database constructor, the database including, for each stored platform, attributes that include at least one platform identifier, the coordinates of the platform, at least one height of a landing zone of the platform, and the radius of a circle within which the platform is inscribed;
  determining a course to be followed in order to reach the target platform; and
  determining a height parameter relative to a minimum decision altitude for a descent in a final approach toward the target platform, wherein the determining a target platform, the determining a course to be followed, and the determining a height parameter are performed by a processor during a parameterization stage on board the aircraft in response to at least one input to a user interface of a parameterization module;
  constructing in a construction stage an approach trajectory implemented by a navigation module; and
  piloting the aircraft to the target platform in accordance with the approach trajectory;
  wherein during the construction stage, the position of an initial approach fix is determined, along with the position of a final approach fix, an offset point and a decision point, in response to the information and in response to the attributes of the target platform, the final approach fix, and the offset point, with the location of the coordinates of the target platform being present in a single vertical plane oriented toward the course, and with the decision point being offset in relation to the vertical plane, wherein the decision point is positioned by determining a longitudinal distance separating the platform from a calculation point, and by determining an orthogonal distance separating the calculation point from the decision point, in order to offset the decision point from the vertical plane according to the following relationships:

$$D1 = a * \cos\left[-\alpha + \arcsin\left(\frac{c}{a} * \sin\alpha\right)\right]$$

$$D2 = a * \sin\left[-\alpha + \arcsin\left(\frac{c}{a} * \sin\alpha\right)\right]$$

with "a"=OR+MDR and "c"=CTEOIP+OR
where "*" represents the multiplication sign; "OR" represents the radius of a circle within which the target platform is inscribed; "MDR" and "CTEOIP" represent two constants set by the constructor; and "α" represents an offset angle set by the constructor.

18. A procedure for facilitating the approach to a platform with an aircraft, said procedure comprises:
  determining a target platform to be reached from among platforms stored in a database by a database constructor, the database including, for each stored platform, attributes that include at least one platform identifier, the coordinates of the platform, at least one height of a landing zone of the platform, and the radius of a circle within which the platform is inscribed;

determining a course to be followed in order to reach the target platform;

determining a height parameter relative to a minimum decision altitude for a descent in a final approach toward the target platform, wherein the determining a target platform, the determining a course to be followed, and the determining a height parameter are performed by a processor during a parameterization stage on board the aircraft in response to at least one input to a user interface of a parameterization module;

constructing in a construction stage an approach trajectory implemented by a navigation module; and piloting the aircraft to the target platform in accordance with the approach trajectory;

wherein during the construction stage, the position of an initial approach fix is determined, along with the position of a final approach fix, an offset point and a decision point, in response to the information and in response to the attributes of the target platform, the final approach fix, and the offset point, with the location of the coordinates of the target platform being present in a single vertical plane oriented toward the course, and with the decision point being offset in relation to the vertical plane, wherein during the parameterization stage, a choice is made regarding the side for the offset of the decision point in relation to the vertical plane.

19. An aircraft comprising:
an on-board computer having a processor;
a non-volatile data memory;
a database stored in the memory, the database including attributes associated with respective platforms of a plurality of landing platforms, the attributes including a platform identifier, platform coordinates, an obstacle radius, and a platform height;
a parametrization module in communication with the memory and having a display configured to present information stored in the database, an interface configured to receive a user input, the processor, the processor being configured to, in response to a user input to the interface, determine a target platform from among the plurality of platforms in the database, determine a course to be followed to reach the target platform, and determine a height parameter relative to a minimum decision altitude for a descent in a final approach toward the target platform; and
a navigation module in communication with the parametrization module, the navigation module being configured to construct an approach trajectory to the target platform based on the attributes associated with the target platform, the course to be followed, and the height parameter, wherein the approach trajectory includes an initial approach fix, a final approach fix, and an offset point, all falling in a common vertical plane with the platform coordinates, and wherein the approach trajectory further includes a decision point that is spaced from the vertical plane.

20. A method for controlling an aircraft, comprising:
providing non-volatile data memory in an aircraft;
providing the data memory with a database, the database including attributes associated with respective platforms of a plurality of landing platforms, the attributes including a platform identifier, platform coordinates, an obstacle radius, and a platform height;
determining a target platform from among the plurality of platforms in the database;
determining a course to be followed to reach the target platform;
determining a height parameter relative to a minimum decision altitude for a descent in a final approach toward the target platform;
constructing an approach trajectory to the target platform based on the attributes associated with the target platform, the course to be followed, and the height parameter, wherein the approach trajectory includes an initial approach fix, a final approach fix, and an offset point, all falling in a common vertical plane with the platform coordinates, and wherein the approach trajectory further includes a decision point that is spaced from the vertical plane; and
piloting the aircraft to the target platform in accordance with the approach trajectory.

* * * * *